US 7,072,508 B2
Jul. 4, 2006

(12) United States Patent
Dance

(54) DOCUMENT OPTIMIZED RECONSTRUCTION OF COLOR FILTER ARRAY IMAGES

(75) Inventor: Christopher R. Dance, Trumpington (GB)

(73) Assignee: Xerox Corporation, Stamford, CT (US)

(*) Notice: Subject to any disclaimer, the term of this patent is extended or adjusted under 35 U.S.C. 154(b) by 750 days.

(21) Appl. No.: 09/681,108

(22) Filed: Jan. 10, 2001

(65) Prior Publication Data

US 2002/0122175 A1 Sep. 5, 2002

(51) Int. Cl.
G06K 9/00 (2006.01)

(52) U.S. Cl. .................................. 382/167; 382/300

(58) Field of Classification Search ..... 348/267.1–271, 348/272–273, 294, 630, 280, 246; 345/600, 345/606, 611; 382/299, 300, 162, 167; 438/70
See application file for complete search history.

(56) References Cited

U.S. PATENT DOCUMENTS

| 3,971,065 A | 7/1976 | Bayer | 358/41 |
|---|---|---|---|
| 4,176,373 A | 11/1979 | Dillon et al. | 358/37 |
| 4,630,307 A | 12/1986 | Cok | 382/25 |
| 4,642,678 A | 2/1987 | Cok | 358/44 |
| 4,716,455 A | 12/1987 | Ozawa et al. | 358/44 |
| 4,724,395 A | 2/1988 | Freeman | 328/151 |
| 4,803,548 A | 2/1989 | Kirk | 358/36 |
| 5,065,229 A | 11/1991 | Tsai et al. | 358/21 |
| 5,373,322 A | 12/1994 | Laroche et al. | 348/273 |
| 5,382,976 A | 1/1995 | Hibbard | 348/273 |
| 5,506,619 A | 4/1996 | Adams, Jr. et al. | 348/272 |
| 5,629,734 A | 5/1997 | Hamilton, Jr. et al. | 348/222 |
| 5,652,621 A | 7/1997 | Adams, Jr. et al. | 348/272 |
| 5,778,106 A | 7/1998 | Juenger et al. | 382/275 |
| 5,990,950 A | 11/1999 | Addison | 348/273 |
| 6,721,003 B1* | 4/2004 | Tsuruoka et al. | 348/240.2 |

OTHER PUBLICATIONS

Eric W. Weisstein, "CRC Concise Encyclopedia of Mathematics" © 1999, CRC Press LLC, pp. 1045-1049.*
U.S. Appl. No. 09/427,833 entitled "Background Surface Thresholding", filed Oct. 26, 1999.
T. Acharyaai, and P.-S. Tsai, "A new block matching Based color interpolation," in *Color Imaging: Device-Independent Color Hard Copy, and Graphic Arts IV*, SPIE vol. 3648, p. 60-65, San Jose, 1999.

(Continued)

Primary Examiner—Vikkram Bali
Assistant Examiner—Colin LaRose

(57) ABSTRACT

An electronic camera imaging system records a color filter array (CFA) image. The missing color values of the CFA image are reconstructed using a linear transformation. The coefficients of the linear transformation are estimated in one embodiment by computing an average value over a window of the CFA image by equalizing the mean and the variance of the color channels of the window. In another embodiment, the coefficients of the linear transformation are estimated by fitting a line to a set of the sums of column and rows of color channels of a window of the CFA image.

18 Claims, 7 Drawing Sheets

OTHER PUBLICATIONS

J. E. Adams Jr., "Interactions between color plane interpolation and other image processing functions in electronic photography", in *Cameras and Systems for Electronic Photography and Scientific Imaging*, SPIE vol. 2416, pp. 144-151, San Jose, 1995.

E. Chang, S. Cheung, and D. Pan, "Color filter array recovery using a threshold-based variable number of gradients," in *Sensors, Cameras, and Applications for Digital Photography*, SPIE vol. 3650, pp. 27-28, San Jose, 1999.

G.C. Holst, *CCD Arrays, Cameras, and Displays*, JCD Publishing. Winter Park, FL, 1996, chapter 3 "CCD ARRAYS", pp. 42-89 and chapter 10 "SYSTEM MTF", pp. 233-274.

K.A. Parulski, "Color filters and processing alternatives for one-chip cameras", *IEEE Transactions on Electronic Devices*, vol. 32, No. 8, pp. 1381-1389, 1985.

X. Wu, W. Choi, and P. Bao, "Color restoration from digital camera data by pattern matching," in *Color Imaging: Device-Independent Color Hard Copy, and Graphic Arts II*, SPIE vol. 3018, pp. 12-17, San Jose, 1997.

C. Dance, L. Fan, *Color Reconstruction in Digital Cameras: Optimization for Document Images*, International Journal on Document Analysis and Recognition, vol. 7, Issue 2-3, Jul. 2005, pp. 138-146.

* cited by examiner

| B | G | B | G |
|---|---|---|---|
| G | R | G | R |
| B | G | B | G |
| G | R | G | R |

| C | M | Y | G | C | M | Y | G |
|---|---|---|---|---|---|---|---|
| Y | G | C | M | Y | G | C | M |
| C | M | Y | G | C | M | Y | G |
| Y | G | C | M | Y | G | C | M |

FIG. 11
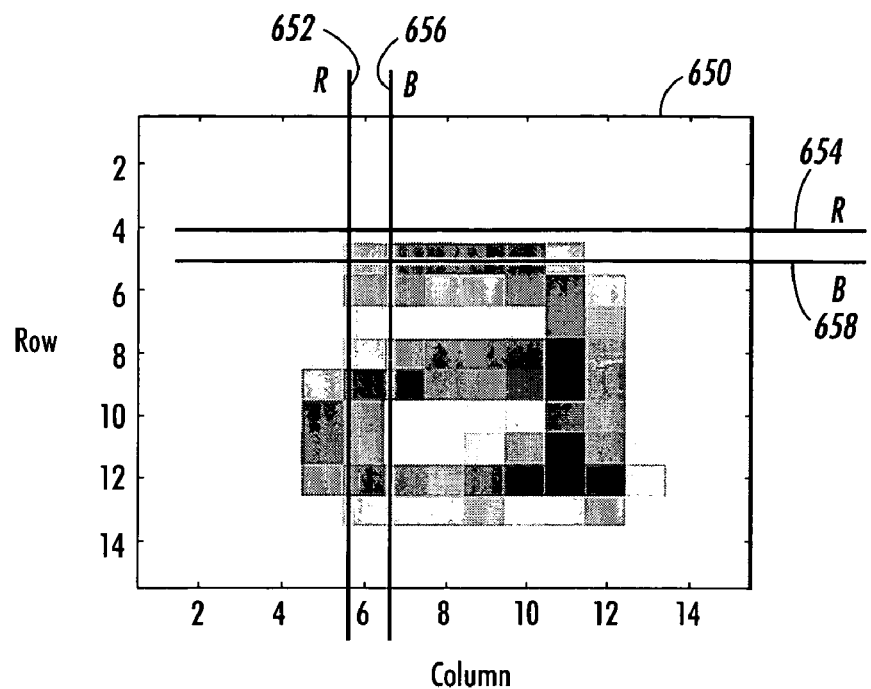
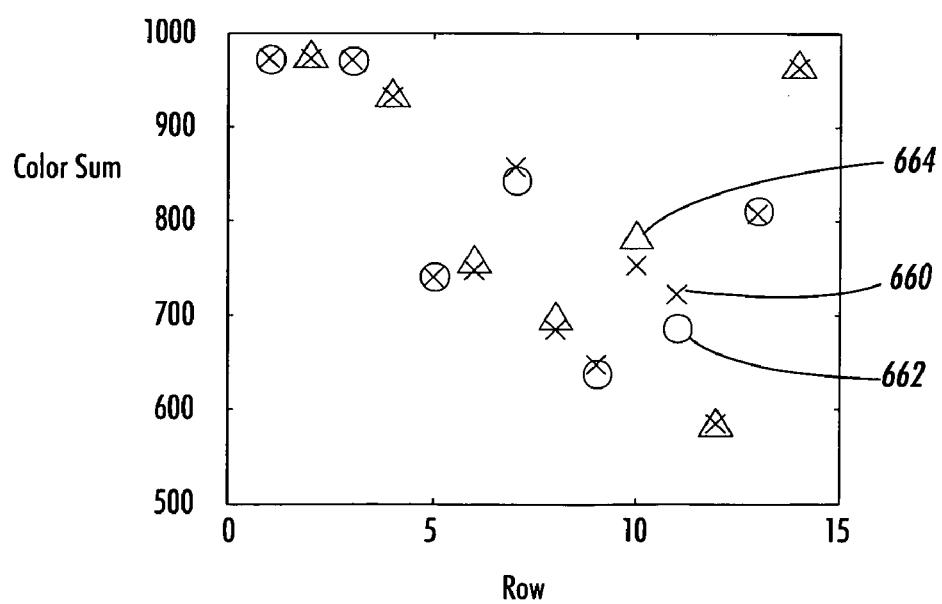
FIG. 12

FIG. 13
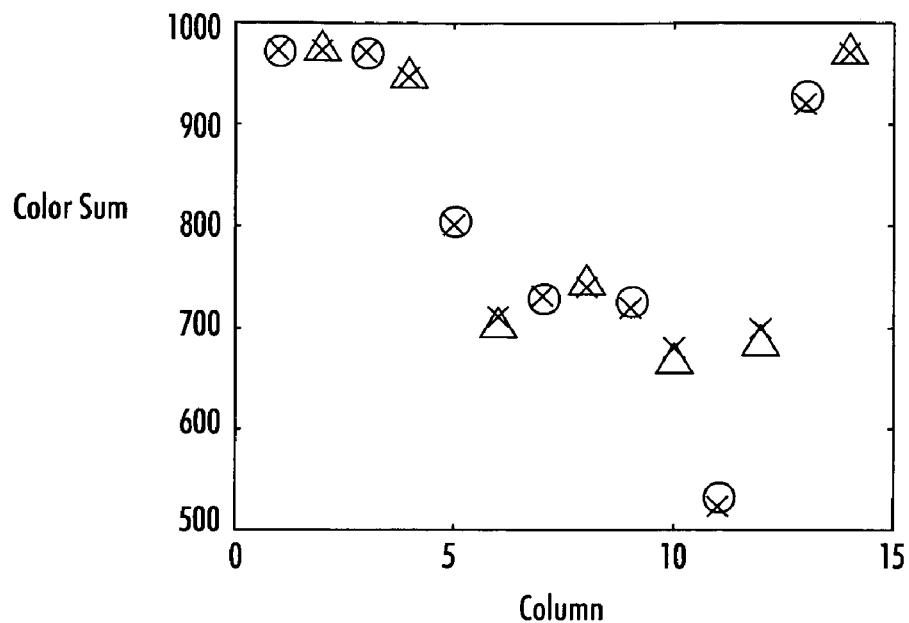
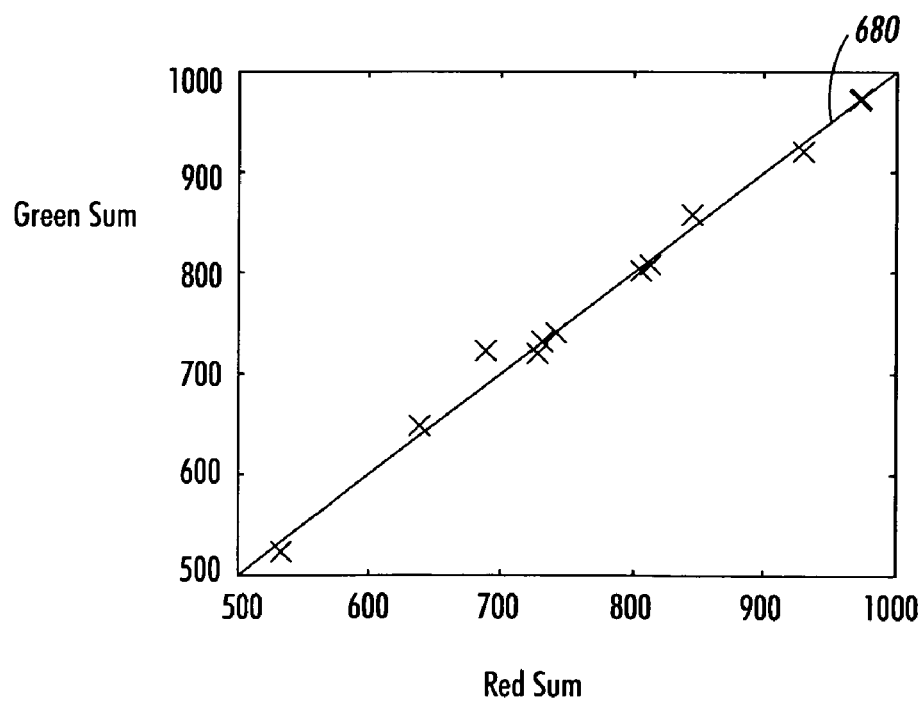
FIG. 14

DOCUMENT OPTIMIZED RECONSTRUCTION OF COLOR FILTER ARRAY IMAGES

BACKGROUND OF INVENTION

The present invention relates generally to the field of electronic imaging, and more particularly, to a method and apparatus for reconstructing images of documents produced using color filter array sensors.

Most electronic color cameras employ a single sensor on which a periodic pattern of dyes of different colors is superimposed. This pattern is known as a color filter array (CFA). Many other color-sampling schemes are possible, such as prisms plus multiple-sensors, random color arrays (as in the human eye), or sampling different colors at different times. However the application of these schemes in consumer digital photography is limited by factors such as the cost of accurate mechanical alignment, fabrication cost, processing complexity, and the degree of motion present in real scenes.

A CFA sensor is used to simultaneously capture three sets of image data in three primary color planes or channels, such as red (R), green (G) and blue (B). A basic CFA sensor is a single two-dimensional array of sensors that are covered by a pattern of red, green and blue filters, such as the Bayer pattern primary CFA illustrated in FIG. 1. The output of a CFA sensor which records only a single color channel at each pixel or senor location is defined herein as a CFA image.

Image processing is used to combine the three primary color planes to create a full-color image from a CFA image. Although the present invention is described while referring to the Bayer pattern CFA, those skilled in the art will appreciate that images obtained from other CFA patterns can be reconstructed using the method and apparatus described herein. An example of another CFA pattern is the Hitachi complementary color (i.e., cyan (C), magenta (M), yellow (Y), and green (G)) CFA, which is illustrated in FIG. 2.

As illustrated in FIG. 3, an approximate full-color full-resolution image stored in memory 306 is generally obtained today using CFA sensors forming part of an image recording module 302 by interpolating the values (e.g., red, green and blue) of the colors that were not sampled at any given pixel in the sensor in interpolator 304. For a Bayer pattern, two forms of interpolation are required: one for synthesizing missing green information, at sites where blue or red are sampled (i.e., luminance reconstruction), and the other for synthesizing missing red/blue information at sites where green or blue/red were sampled (i.e., chrominance reconstruction).

Since CFA sensors like the Bayer pattern sample chrominance less frequently than luminance, there is more risk of generating aliasing artifacts during chrominance reconstruction. Consequently, CFA signal processing has been improved over time to correct such artifacts created during chrominance reconstruction. For more background on CFA imaging and reconstruction see for example the following U.S. patent Nos., which are incorporated herein by reference: U.S. Pat. Nos. 3,971,065; 5,382,976; 5,506,619; 5,629,734.

Signal processing techniques have also been developed for luminance reconstruction. Three common methods for luminance reconstruction are: bilinear interpolation, which takes the average of four surrounding green pixels; low-pass filtering, which finds the convolution of the greens with a finite window approximation of a sinc function at forty five degrees to the rows and columns of the sensor; and median interpolation, which takes the average of the two middle-ranking surrounding green pixels.

Because these known methods of luminance reconstruction introduce artifacts, notably in the vicinity of edges, due to the indiscriminate nature of the averaging that they apply, decision directed interpolation methods have been devised that select an interpolator on the basis of locally detected patterns. Examples of the features that have been employed for deciding which is the appropriate interpolator include: the local-average-thresholded image, and the local gradient and Laplacian values. For additional background on methods aimed at reducing chrominance artifacts see for example the following U.S. patent Nos., which are incorporated herein by reference: U.S. Pat. Nos. 4,642,678; 4,716,455; 4,716,455; 4,724,395; 4,803,548; 5,629,734; 5,373,322; 5,778,106.

Since existing luminance reconstruction methods employ spatial interpolation to reconstruct green channel information, it is inevitable that the effective resolution of CFA reconstructed images containing many small edges, like text in document images, will be lower than images from an equivalently sized gray-scale sensor. This results in greatly reduced legibility of document images for both machines and humans. Accordingly, it would be desirable to provide an electronic camera imaging system that reconstructs missing green channel values in CFA images using other than spatial interpolation to avoid such resolution-loss.

SUMMARY OF INVENTION

In accordance with the invention, chrominance samples of a color filter array (CFA) sensor are used to reconstruct a higher-resolution luminance channel by making assumptions about the relation between different color channels. Advantageously, reconstructed CFA images recording document images have improved legibility because high spatial frequency information about character shapes in document images is retained by the reconstruction method of the present invention.

In accordance with one aspect of the invention there is provided an apparatus, and method therefor, for reconstructing CFA images. An image-recording module generates an image of sampled values output from a color filter array. Each pixel in the image has a location at which a sampled value of one of a plurality of color channels is recorded. An image reconstruction module linearly transforms the sampled value at the location of a selected pixel in the image to estimate a color channel not recorded by the image recording module at the location of the selected pixel in the image. That is assuming a lens free of chromatic aberration, the linear transformation is used to estimate missing color channels at the selected pixel location using the sampled value at that location.

In accordance with another aspect of the invention, coefficients of the linear transformation are estimated in a first embodiment by computing statistics that depend on the sampled value but not the position of the samples of at least two color channels within a window of the image. According to this embodiment, the coefficients can be computed by, for example, computing an average value over a window of the image by equalizing mean and variance of each of the color channels of the window.

In accordance with yet another aspect of the invention, coefficients of the linear transformation are estimated in a second embodiment by fitting a line using regression to at least one set of sums of color channels along lines through a window of the image. For example, sets of sums of the red color channel of the Bayer pattern are determined by computing a regression using pairs of red and green sums in red rows.

BRIEF DESCRIPTION OF DRAWINGS

These and other aspects of the invention will become apparent from the following description read in conjunction with the accompanying drawings wherein the same reference numerals have been applied to like parts and in which:

FIG. 11 illustrates an image of the letter "a";

FIG. 12 illustrates a plot of color sums computed along rows of the image shown in FIG. 11;

FIG. 13 illustrates a plot of color sums computed along columns of the image shown in FIG. 11; and FIG. 14 illustrates the regression of a line that estimates coefficients of the red channel using the sums shown in FIGS. 12 and 13.

DETAILED DESCRIPTION

1. Overview

Figure 4:
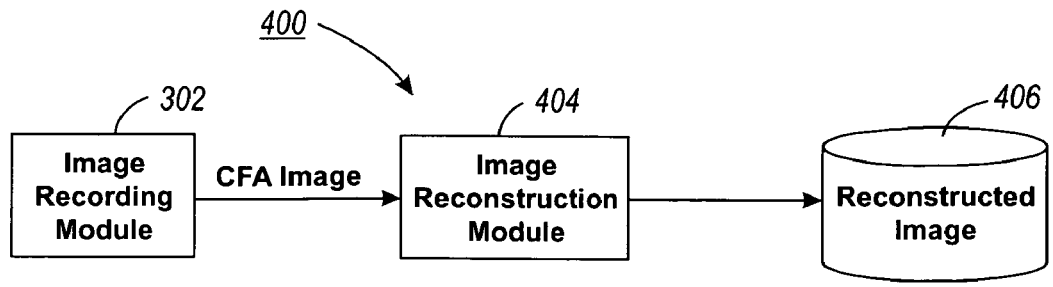
FIG. 4 illustrates a block diagram of an electronic camera imaging system incorporating the present invention.

Referring now to the drawings, FIG. 4 illustrates a block diagram of an electronic camera imaging system 400 incorporating the present invention. The system 400 includes in part an image recording module 302 that outputs a CFA image to an image reconstruction module 404. It will be appreciated that in alternate embodiments additional processing may be performed before the CFA image is output to the image reconstruction module 404. For example, the CFA image may be compressed, transmitted and decompressed prior to reaching the image reconstruction module 404. The reconstruction module 404 estimates missing color channel values by linearly transforming sampled color channel values in the CFA image. The output of the image reconstruction module 404 is stored in memory 406 as a full-color or gray-scale full-resolution reconstructed image. It will be appreciated that in alternate embodiments additional processing may be performed before the image is stored in the memory 406. For example, the image may be either compressed or sub-region sampled prior to being stored in memory 406.

Figures 1, 2, 3:
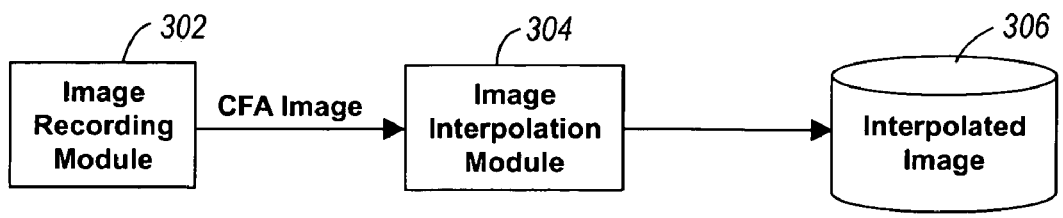
FIG. 1 illustrates the pattern of the primary CFA for a Bayer pattern.
FIG. 2 illustrates the pattern of the CFA for the Hitachi complementary color pattern.
FIG. 3 illustrates a block diagram of a CFA electronic camera imaging system with an image interpolator as is known in the art.

As known in the art, the image recording module 302 includes in part an image sensor for recording an image directed through conventional optics. The image filter is covered by a CFA, such as the Bayer filter illustrated in FIG. 1. When the image sensor is exposed to light, each pixel value in the image sensor records either a red, green, or blue color value depending on the color filter applied to that pixel location. These color values are converted using a conventional analog to digital converter to generate a CFA image, which is input to the image reconstruction module 404.

A processor (not shown) with operating memory (not shown) controls the operation of the system 400. The processor receives input signals from a user to record an image by engaging the image recording module. Once part or all of the CFA image is produced, the processor engages the image reconstruction module 404. The reconstructed image is stored in memory 406 for later display or transfer to another device.

Figure 5:
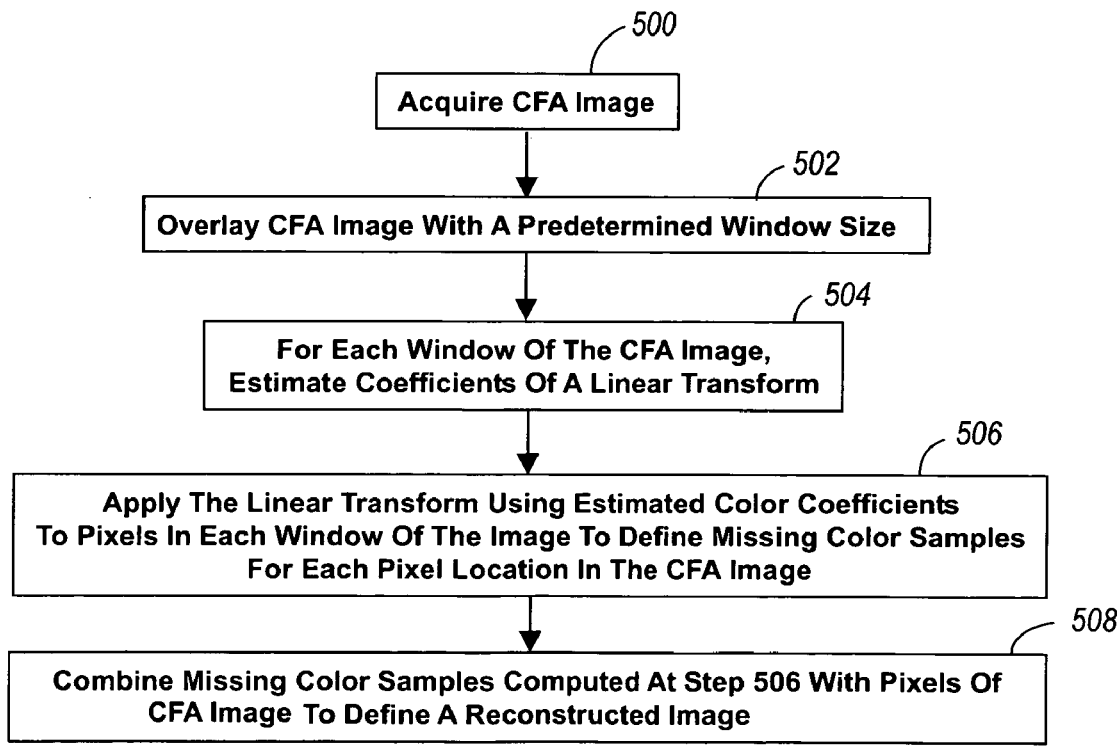
FIG. 5 illustrates a flow diagram that sets forth the steps performed by the image reconstruction module shown in FIG. 4 to produce a reconstructed image from a CFA image.

FIG. 5 illustrates a flow diagram that sets forth the steps performed by the image reconstruction module 404 to produce a reconstructed image from a CFA image. Initially at step 500, the CFA image is acquired from the image recording module 302. Subsequently at step 502, the CFA image is divided into windows having a predefined size "W". In one embodiment, the window size is 32×32 pixels that overlap neighboring windows on each side by 16 pixels. At step 504, coefficients of a linear transformation are estimated for each of the windows of the CFA image identified at step 502.

At step 506, the linear transformation is applied to each pixel of the windows in the CFA image defined at step 502 using the coefficients estimated at step 504 to compute samples of missing color channels in the original document image. In the embodiment specified above with a 32×32 window size, each window overlaps neighboring windows by 16 pixels so that the linear transformation is applied to only the center 16 pixels of fully overlapped pixels windows at step 506. At step 508, a full-color or gray-scale image is reconstructed by combining the observed CFA samples with the samples estimated at step 506.

2. Intuition for Using a Linear Transformation

The linear transformation specified at step 506 shown in FIG. 5 is defined for two color channels. It is assumed herein that within a small enough region on the surface of the object being imaged (for example a document with text), there exist combinations of materials with only two distinct diffuse reflectance functions (for example white paper and a combination of color toners) and a constant illuminant color. When these reflectances are multiplied by the illuminant, two colors, namely the foreground and background colors are formed. It is further assumed that the imaging process consists of a blurring and sampling process in which the blurring is linear and independent of color. Advantageously, the present invention exploits this local two-color property to retain the resolution of a gray-scale sensor while using a CFA color sensor. Rather than making spatial assumptions and interpolating missing CFA sampled color values, the linear transformation specified at step 506 is used to linearly transform sampled color values to missing color values by making color coherence assumptions.

Figure 6:
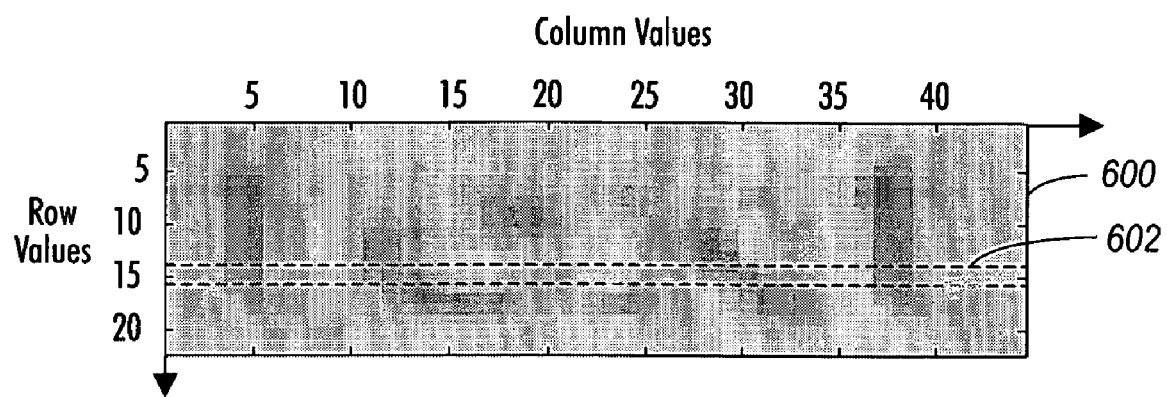
FIG. 6 illustrates a document image defined using green and red color channels that forms the characters "text" therein.
Figure 7:
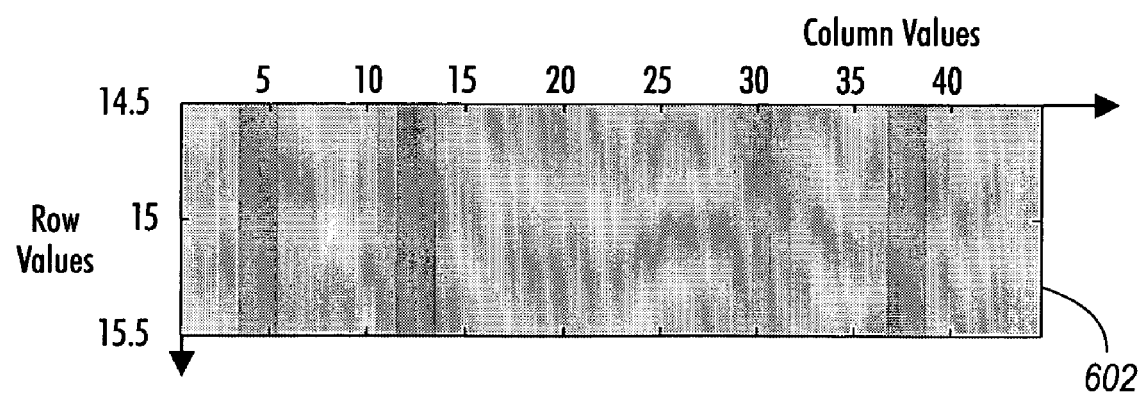
FIG. 7 illustrates a section of the document image shown in FIG. 6.
Figure 8:
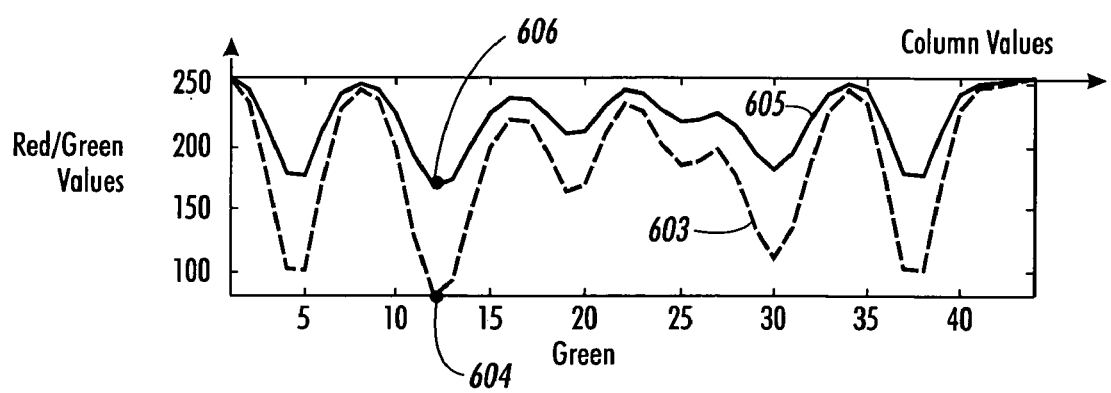
FIG. 8 illustrates a graph of the green color channel and the red color channel as they change along the column axis of the section of the document image shown in FIG. 7.
Figure 9:
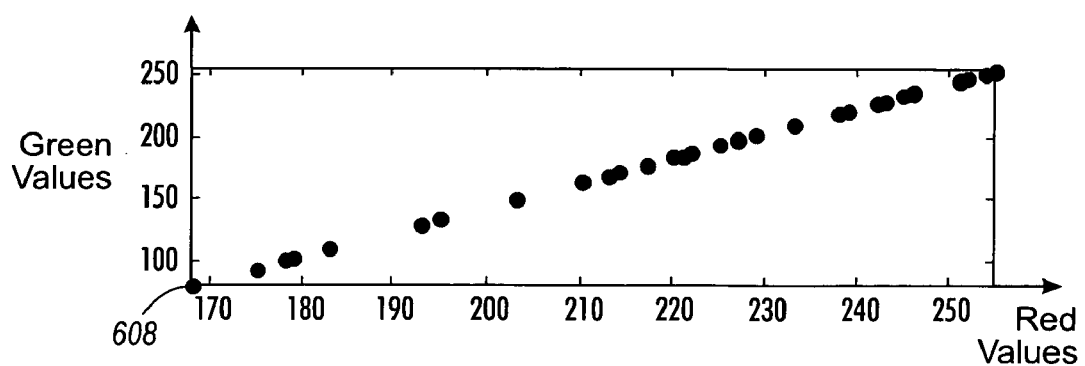
FIG. 9 illustrates a graph that plots values of the green color channel against the values of red color channel at a corresponding column location as shown in the graph in FIG. 8.

The intuition for defining a linear relationship between a foreground and a background color is illustrated in FIGS. 6–9. FIG. 6 illustrates a document image 600 with the characters "text" set forth therein, which is defined using green and red color channels. FIG. 7 illustrates the section 602 of the document image 600 shown in FIG. 6. FIG. 8 illustrates a graph of the green color channel 603 and the red color channel 605 as they change along the column axis of the section 602 of the document image 600 shown in FIG. 7. FIG. 9 illustrates a graph that plots values of the green color channel against the values of red color channel at a corresponding column location as shown in the graph in FIG. 8. For example, the green color channel value 604 and corresponding red color channel value 606 on the graph shown in FIG. 8 specify sample point 608 on the graph shown in FIG. 9.

As shown in FIG. 9, there exists a linear relationship between the colors forming the section or portion 602 of the document image 600 shown in FIGS. 6 and 7. Exploiting this linear relationship permits luminance values to be estimated using a linear transformation of sampled chrominance values in a CFA image.

3. Model for Estimating the Linear Transformation

To derive estimators for the linear transformation set forth in step 506 shown in FIG. 5, the following model is defined for the pixel value of each color channel R, G, B that would be sampled at position, (y,x), were that position is the center of an R/G/B pixel. As defined herein "y" denotes the row of an image and "x" denotes the column of the image. It is assumed that there is only diffuse reflection and no noise and that the pixel value generation process is linear (i.e., the camera's gamma equals one). Under these assumptions, to a good approximation, any sampled pixel value may be specified as the integral over wavelength of the product of the object (e.g., paper plus ink or toner) reflectance, the color filter transmission spectrum, the sensor element sensitivity spectrum, and the illuminant spectrum.

For a pure background point, this integral is factored as a product of a (scalar) diffuse illuminant intensity $D(y,x)$ with a color vector with components $K_r$, $K_g$, $K_b$. Likewise, the pixel value sampled at a pure foreground point may be written as the product of $D(y,x)$ with a foreground color vector $(F_r, F_g, F_b)$. The effects of blur imply that any sampled value will be a linear combination of the foreground and background pixel values. If the blur is the same for each channel at any given point, then the linear combination can be described by one scalar function $\alpha(y,x)$ for all channels, which has value one at pure foreground points and zero at pure background points. Under these assumptions, the pixel values that would be observed for each channel may be written as follows:

$R(y,x)=D(y,x)(\alpha(y,x)F_r+(1-\alpha(y,x))K_r)$, $G(y,x)=D(y,x)(\alpha(y,x)F_g+(1-\alpha(y,x))K_g)$, $B(y,x)=D(y,x)(\alpha(y,x)F_b+(1-\alpha(y,x))K_b)$.

Using the equations above, $G(y,x)$ is estimated at a point where only R or B is known. To use the above equations directly it is necessary to know six constants (i.e., $F_r$, $F_g$, $F_b$, $K_r$, $K_g$, $K_b$) and two scalar functions (i.e., $D(y,x)$ and $\alpha(y,x)$). In camera images of documents, since lighting variation (i.e., diffuse illuminant intensity $D(y,x)$) is usually slowly varying, $D(y,x)$ is relatively easy to estimate. However, the pure foreground pixel value (i.e., $F_r$, $F_g$, $F_b$) is hard to estimate due to the thinness of character strokes in document images, and the function $\alpha(y,x)$ is rapidly varying. This suggests the elimination of $\alpha(y,x)$ by simultaneously solving for example the equations above to estimate G and R, and G and B as follows:

$$G(y, x) = \frac{K_g - F_g}{K_r - F_r}(R(y, x) - K_r D(y, x)) + K_g D(y, x),$$

$$G(y, x) = \frac{K_g - F_g}{K_b - F_b}(B(y, x) - K_b D(y, x)) + K_g D(y, x).$$

In one embodiment (hereinafter referred to as "Embodiment A"), these equations may be rewritten in terms of easier-to-estimate foreground and background constant parameters "$a_c$" and "$h_c$" (with color channels C, i.e., R, G, B), local samples $R(y,x)$, $G(y,x)$, and $B(y,x)$, and the function $D(y,x)$ as follows:

$G(y,x)=a_r R(y,x)+h_r D(y,x)$, $G(y,x)=a_b B(y,x)+h_b D(y,x)$.

In another embodiment (hereinafter referred to as "Embodiment B"), it is often the case that the background color $D(y,x)$ is sufficiently slowly varying in a document image that it can be considered constant within a defined window size. In Embodiment B, the equations above may be formulated in terms of foreground and background constant parameters "$a_c$" and "$h_c'$" (with color channels C, i.e., R, G, B) and local samples $R(y,x)$, $G(y,x)$, and $B(y,x)$, as follows:

$G(y,x)=a_r R(y,x)+h_r'$, $G(y,x)=a_b B(y,x)+h_b'$.

Embodiment B corresponds to the flow diagram shown in FIG. 5, in which a window based approach is used to compute both foreground and background color coefficients "a" and "h'". In one implementation of Embodiment B set forth above, a 32×32 pixel window that overlaps by 16 pixels on each side is preferred.

Figure 10:
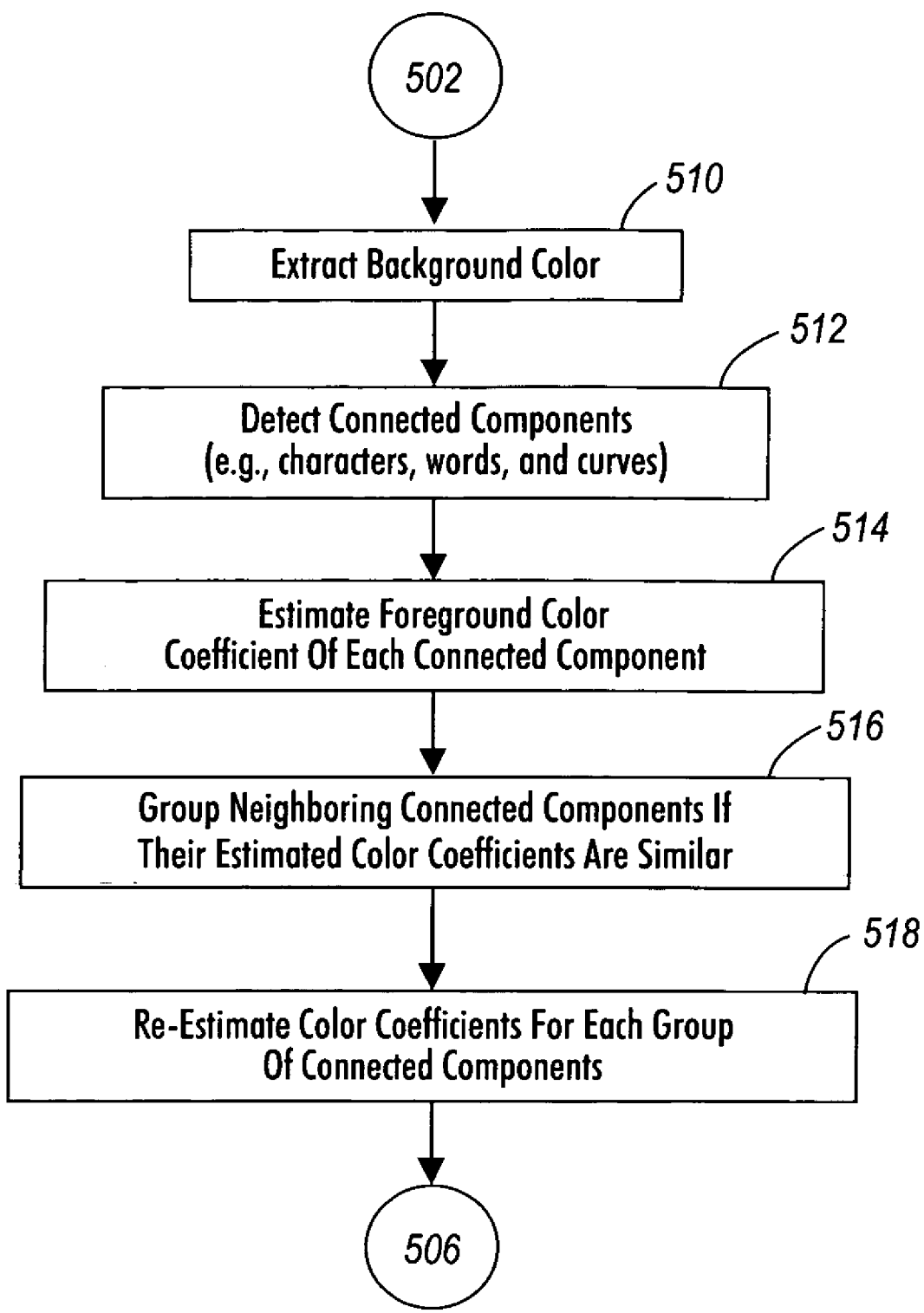
FIG. 10 is a flow diagram of an alternate embodiment of the flow diagram shown in FIG. 5 in which the step 504 in FIG. 5 is substituted for the steps 510, 512, 514, 516, and 518 shown in FIG. 10.

Embodiment A corresponds to the flow diagram shown in FIG. 10, in which step 504 in FIG. 5 is substituted with steps 510, 512, 514, 516, and 518. Unlike Embodiment B, background color is determined at step 510 in Embodiment A. One method for determining background color is disclosed in U.S. Pat. No. 6,577,762 entitled "Background Surface Thresholding", which is incorporated herein by reference. As set forth therein, background color is determined by applying the disclosed method to each channel of a low-pass filter reconstructed image. At step 512, connected components are found, for example, by applying background surface thresholding to the luminance of the low-pass reconstructed image. At step 514, the foreground color coefficients for each binary connected component are determined by applying one of the methods given below in Section 4 to the region of the raw-data corresponding to a dilation of the component. At step 516, a clustering procedure is used to group components that are in close spatial proximity and that have similar estimated foreground color coefficients. This clustering step enables more accurate estimation of foreground color coefficients, particularly for small connected components.

In one embodiment at step 516, a region-growing segmentation is applied starting from a Voronoi graph of the connected components. Preferably, agglomerative clustering is used at step 516, in which a t-test is performed on the color coefficients of all neighboring pairs of components (or sets of previously merged components) and the pair that gives the best confidence value for the test is merged. This process is repeated until no pair has a sufficiently high confidence value. At step 518, for each group of connected components, the foreground color coefficients are re-estimated. The final coloring of the missing color samples in the CFA image is again determined by a pixel-wise linear transformation at step 506 using the estimated foreground coefficients and the estimated local background color.

4. Estimating the Coefficients of the Linear Transformation

In this section two methods for estimating the coefficients "a" and "h" or "h'" of the linear transformations of Embodiments A and B defined above in Section 3. The first method, which is defined herein as the "variance method", is preferably used to estimate the coefficients for document images that do not contain many rapidly varying colors. The second method, which is defined herein as the "profiles method", is preferably used to estimate the coefficients for document images with a range of different colors of text.

4.7 The Variance Method

The variance method selects the coefficients to equalize the mean $\mu_c$ and variance $\sigma_c^2$ of each of the color channels C (e.g., R, G, B) within some window W (e.g., 32×32 pixels). That is, the variance method assumes that sets of pixels close together in some window W have similar first-order statistics (i.e., statistics that depend on the sampled value but not the position of the samples of at least two color channels within the window W), even though the underlying image may be highly non-stationary and non-smooth, as is typical of text. Given this assumption, a histogram of two color channels in the window W should have similar appearances. Thus, it follows that the coefficients "a" and "h'" of the linear transformations of Embodiment B under the variance method can be computed at step 504 in FIG. 5 as follows:

$$a_r = \sqrt{\frac{\sigma_G^2}{\sigma_R^2}},$$

$$a_b = \sqrt{\frac{\sigma_G^2}{\sigma_B^2}},$$

$$h_r' = \mu_G - a_r \mu_R,$$

$$h_b' = \mu_G - a_b \mu_B.$$

It will be appreciated by those skilled in the art that the variance method only determines the magnitude, but not the sign of the coefficients "a". The overlap of the spectral sensitivities of the color filter arrays and the nature of common illuminants and ink/toner reflectances makes it unlikely that the coefficients a are negative.

The variance method would be optimal if all the pixels of an image were independently drawn from a normal distribution. However, this is a poor assumption for document images. Performance of the variance method degrades when windows are too small and contain strong, that is high gray-level gradient, horizontal or vertical edges. For example, large errors in estimating the coefficients results if the image sampling grid is positioned such that a column of alternating red/green pixels falls on the dark side of a strong vertical bar and the neighboring column of alternating green/blue pixels falls on the light side of the bar.

It will also be appreciated by those skilled in the art that the variance method can be similarly used to compute the coefficients "a" and "h" for Embodiment A by normalizing the observed colors with the estimated background color. That is, computing:

$$R'(y,x) = R(y,x)/D(y,x),$$

$$G'(y,x) = G(y,x)/D(y,x),$$

$$B'(y,x) = B(y,x)/D(y,x),$$

and using the mean and variance of R', G', B' in the four equations at the start of this section.

4.2 The Profiles Method

The profiles method attempts to exploit the presence of strong edges by modeling the rows or columns of some image window W as level sets (i.e., regions of constant pixel value). Given an image of a horizontal bar lying along a red/green row of an image, the sum of the pixel values of red pixels along the bar should equal the sum of the green pixels along the bar (plus or minus some corrections for sub-pixel shifts in the ends of the bar). Given a set of such (e.g., green sum, red sum) pairs for various rows or columns of an image window, a line is fit to them to determine the coefficients.

More specifically using the profiles method, the coefficients of the red channel of the linear transformation in Embodiment B are computed at step 504 in FIG. 5 in two steps. At the first step, the sums of red (R) and green (G) pixels along each row and column of a window W of a CFA image that contains red pixels is determined.

More specifically, at the first step given a window W of a CFA image with "h" red rows and "w" red columns, these sums are considered as a vector of length h+w (hereinafter referred to as the "sums vector"), with all the row sums followed by all the column sums. In summations given here, the index is taken to range over all the pixels of the type indicated by the summand for the given window. The coordinate origin is chosen to be the top left of the window W, which is a red pixel. The red sum and green sum for row k are:

$$x_k = \sum_c R(2k, c),$$

$$y_k = \sum_c G(2k, c).$$

Likewise, the red sum and green sum for column k are:

$$x_{h+k} = \sum_r R(r, 2k),$$

$$y_{h+k} = \sum_r G(r, 2k).$$

In the second step, a line is fit to a plot consisting of the red and green row sum pairs and column sum pairs in the sums vector by least squares linear regression. The results of the linear regression provide estimates for the coefficients of the linear transformations in Embodiments A and B.

FIGS. 11–14 illustrate an example of the application of the profiles method. This example applies the profile method to an image of a letter "a" with baseline at zero degrees to sampling grid 650 as shown in FIG. 11. The sums for red and green row sum pairs and column sum pairs are illustrated in FIGS. 12 and 13, respectively. Note that in FIGS. 12 and 13 a cross (e.g., cross 660) signifies a green sum on a red or blue line through the sampling grid 650 (e.g., column line 652 and row line 654), a circle (e.g., circle 662) signifies a red sum on a red line, and a triangle (e.g., triangle 664) signifies a blue sum on a blue line (e.g., column line 656 and row line

658). In this example, the normalization coefficient determined by regression of line 680 of the plot of the green and red sum pairs is unity as shown in FIG. 14.

Note that an analogous procedure is used to estimate the coefficient for the blue channel using the blue sums on blue lines computed and illustrated in FIGS. 12 and 13. It follows that in estimating coefficients for the blue channel, in addition green sums on blue lines must be computed. Given these the green and blue sum pairs, a regression of a plot of blue sums on blue lines and green sums on blue lines is used to compute the blue channel's coefficients.

4.3 Alternate Embodiments of the Profiles Method

In an alternate embodiment, when one of the points on the line is known, for example when it is known that the background color is pure black (i.e., zero values for red, green, and blue), or has been normalized to be pure black by employing a separate background color estimation phase as in Embodiment A above, constrained linear least squares regression procedures may be employed. Appropriate background normalization or constrained least squares procedures for such cases will be evident to those skilled in the art. In a further alternate embodiment, a confidence measure is computed for each row or column sum pair and only pairs of sums with the best confidence measures are included in the linear regression. In yet a further alternate embodiment, a variance measure, rather than a confidence measure is computed for each line sum pair and a weighted linear regression applied to estimate the color coefficients using some subset of the pairs of sums.

The following is an illustration of one combination of these alternate embodiments, in which the background color is assumed to be pure black and a confidence measure is used to decide which pairs of sums to include in the regression. Here the profiles method is adapted to account for rows or columns that may be poorly modeled as level sets and are best left out of the linear regression. This alternate embodiment of the profiles method accomplishes this by selecting rows or columns that have a low total variation relative to their sum. In this alternate embodiment, a confidence measure is determined for each row and column, by taking the ratio of the green sum to the total variation V of the green pixels in the row or column. For a row k, the total variation V is defined as:

$$V_k = \sum_c |G(2k, c) - G(2k, c-2)|.$$

The confidence measure, Q, is considered to be a vector of length h+w and includes a parameter measuring the strength of noise in the image, $\sigma$, which is weighted by the square root of the number of pixels in the image row or column, n, as follows:

$$Q_k = \frac{|y_k|}{\sqrt{n}\,\sigma + V_k}.$$

The rows and columns that have the P largest values of Q are selected and fit to a line by a least squares linear regression. In this alternate embodiment, if the window W of the CFA image corresponds to a character bounding box, then P=4. If "op" denotes the index such that $Q_{op}$ is the $p^{th}$ largest value of Q, then the estimate of the coefficient of a is given by:

$$a_r = \frac{\sum_{p=1}^{P} y_{op} x_{op}}{\sum_{p=1}^{P} x_{op} x_{op}}.$$

An analogous procedure is used to estimate the coefficient for the blue channel.

In the alternate embodiment employing a weighted linear regression procedure, rather than the confidence procedure, a suitable variance measure for a pair of color sums is given by the quantity:

$$n\sigma^2 + V_k^2.$$

5. Application of Estimated Coefficients

Once the coefficients "a" and "h" or "a" and "h'" in either Embodiment A or B, respectively, have been determined, the green channel of the image is obtained by applying the linear transformations set forth above. If a full color image is desired, missing red (blue) pixels may be determined at a sampled green or blue (red) pixel analogously. For a system operating using Embodiment A, the transformation for determining missing red pixels given green and blue pixels is as follows:

$$R(y,x) = (G(y,x) - h_r D(y,x))/a_r,$$

$$R(y,x) = (a_b B(y,x) + (h_b - h_r) D(y,x))/a_r.$$

For a system operating using Embodiment B, the transformation for determining missing red pixels given green and blue pixels is as follows:

$$R(y,x) = (G(y,x) - h_r')/a_r,$$

$$R(y,x) = (a_b B(y,x) + h_b' - h_r')/a_r.$$

6. Miscellaneous

Parts of the system may be readily implemented in software using software development environments that provide portable source code that can be used on a variety of hardware platforms. Alternatively, parts of the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The invention claimed is:

1. An apparatus for reconstructing color filter array images, comprising:
   an image recording module for generating an image of spatially consistent sampled values output from a color filter array; each of a plurality of pixels in the image having a location at which a sampled value of only one of a plurality of color channels is recorded; and an image reconstruction module for linearly transforming the sampled value at the location of a selected one of the plurality of pixels in the image to estimate a color channel not recorded by the image recording module at the location of the selected pixel in the image;

wherein the image reconstruction module computes coefficients of a linear transformation using color channels of sampled values of the plurality of pixels in the image without interpolating values of other color channels of the plurality of pixels not recorded in the image by the image recording module; and wherein the image reconstruction module fits the linear transformation to at least one pair of sums of color channels that are summed along lines through a window of the image.

2. The apparatus according to claim 1 wherein the image reconstruction module determines one or more of a confidence and a variance measure for the sums of the color channels.

3. The apparatus according to claim 2, wherein the image reconstruction module selects rows or columns of the window that have a low variance within their sum of color channels and determines with a confidence measure which of sums of the rows or columns of the window to select to fit a line thereto.

4. The apparatus according to claim 1, wherein the reconstruction module computes the pair of sums of color channels along lines of columns or rows, or a combination thereof, of the window.

5. The apparatus according to claim 4, wherein the image reconstruction module computes the pair of sums of color channels along rows and columns of a window by (a) determining sums of pixel values of two color channels along those rows and columns of the window that contains samples of both color channels, and (b) fitting a line to the sums of pixels values corresponding to one color channel against the sums of pixel values corresponding to the other color channel.

6. The apparatus according to claim 5, wherein the image reconstruction module fits the pair of sets of color channel sums using least squares linear regression.

7. A method for reconstructing color filter array images, comprising:

recording an image of spatially consistent sampled values output from a color filter array; each of a plurality of pixels in the image having a location at which a sampled value of only one of a plurality of color channels is recorded;

computing coefficients of a linear transformation using color channels of sampled values of the plurality of pixels in the image without interpolating values of other color channels of the plurality of pixels not recorded in the image; and using the linear transformation and the sampled value at the location of a selected one of the plurality of pixels in the image to estimate a color channel not recorded at the location of the selected pixel in the image;

wherein said computing further comprises fitting the linear transformation to at least one pair of sums of color channels that are summed along lines through a window of the image.

8. The method according to claim 7, wherein one or more of a confidence and a variance measure are determined for the sums of the color channels.

9. The method according to claim 8, further comprising: selecting rows or columns of the window that have a low variance within their sum of color channels; and determining with a confidence measure which of sums of the rows or columns of the window to select to fit a line thereto.

10. The method according to claim 7, wherein the pair of sums of color channels is computed along lines of columns or rows, or a combination thereof, of the window.

11. The method according to claim 10, wherein the pair of sums of color channels is computed along rows and columns of a window by (a) determining sums of pixel values of two color channels along those rows and columns of the window that contains samples of both color channels, and (b) fitting a line to the sums of pixels values corresponding to one color channel against the sums of pixel values corresponding to the other color channel.

12. The method according to claim 11, further comprising fitting the pair of sets of color channel sums using least squares linear regression.

13. A method for reconstructing color filter array images, comprising:

(a) acquiring an image using a color filter array that records spatially consistent samples of a plurality of color channels with only one sample of different ones of the plurality of color channels being recorded at each pixel in the image;

(b) assigning a selected pixel in the image to a window;

(c) using the color channels of recorded samples to estimate coefficients for a linear transformation for the window assigned to the selected pixel in the image without interpolating values of color channels not recorded in the image by fitting the linear transformation to at least one pair of sums of color channels that are summed along lines through the window assigned to selected pixel in the image;

(d) estimating a value for one or more of the plurality of color channels not recorded at the selected pixel location with (i) the recorded sample at the selected pixel location and (ii) the linear transformation for the window assigned to the selected pixel; and (a) repeating (b), (c) and (d) for other selected pixels in the image.

14. The method according to claim 13, wherein one or more of a confidence and a variance measure are determined for the sums of the color channels.

15. The method according to claim 14, further comprising:

selecting rows or columns of the window that have a low variance within their sum of color channels; and determining with a confidence measure which of sums of the rows or columns of the window to select to fit a line thereto.

16. The method according to claim 13, wherein the pair of sums of color channels is computed along lines of columns or rows, or a combination thereof, of the window.

17. The method according to claim 16, wherein the pair of sums of color channels is computed along rows and columns of a window by (a) determining sums of pixel values of two color channels along those rows and columns of the window that contains samples of both color channels, and (b) fitting a line to the sums of pixels values corresponding to one color channel against the sums of pixel values corresponding to the other color channel.

18. The method according to claim 17, further comprising fitting the pair of sets of color channel sums using least squares linear regression.

* * * * *